Jan. 25, 1927.
H. S. CLARK
AEROPLANE
Filed June 8, 1926
1,615,682
2 Sheets-Sheet 1
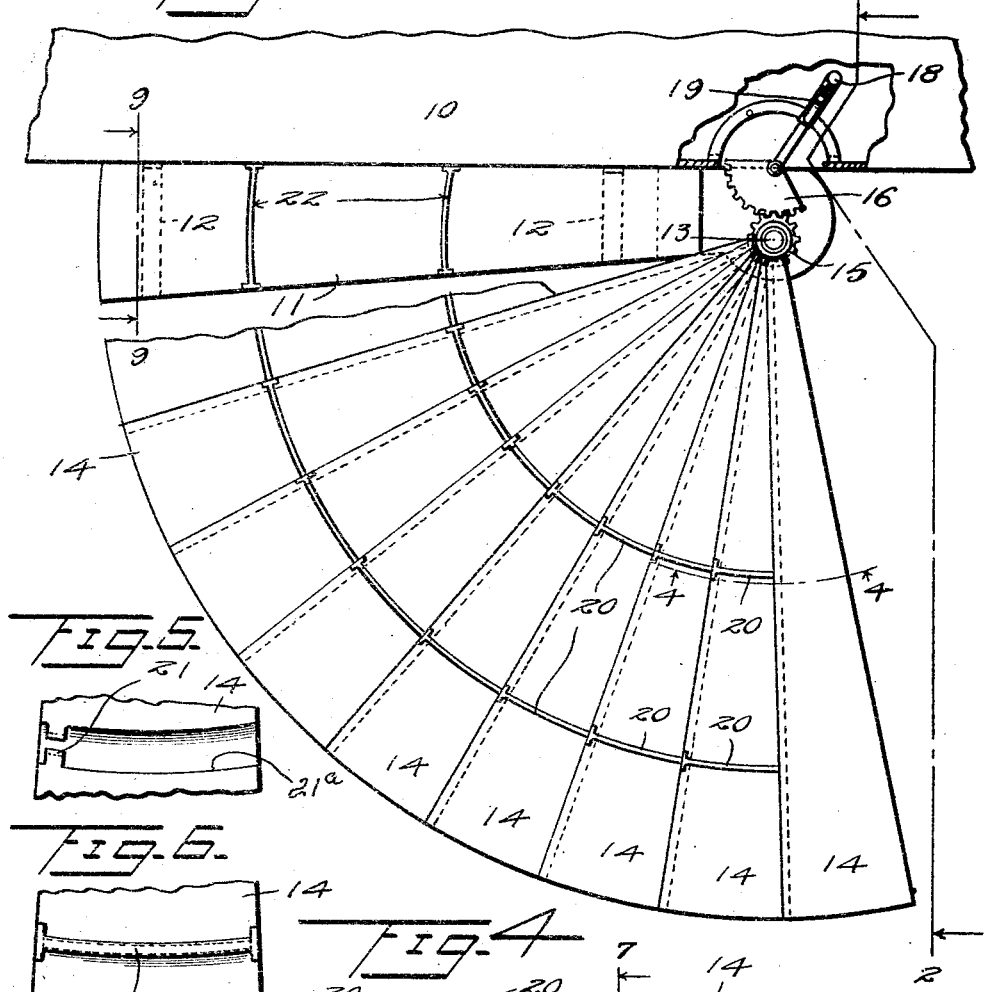
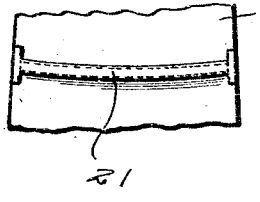
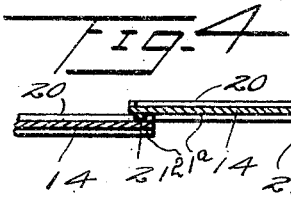
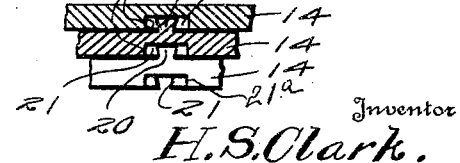
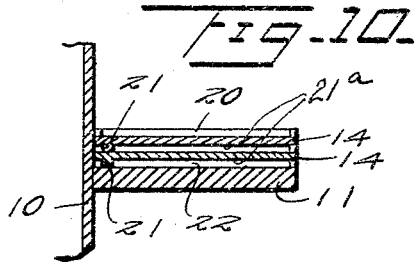
Inventor
H. S. Clark.
By Watson E. Coleman
Attorney Jan. 25, 1927.  H. S. CLARK  1,615,682
AEROPLANE
Filed June 8, 1926   2 Sheets-Sheet 2
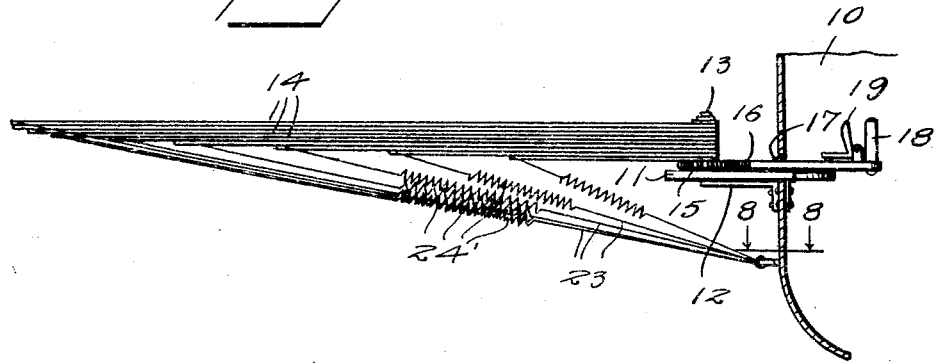
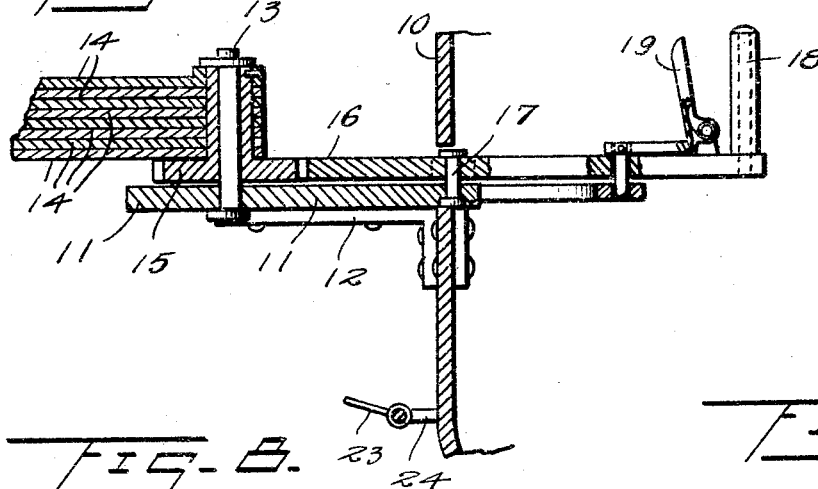
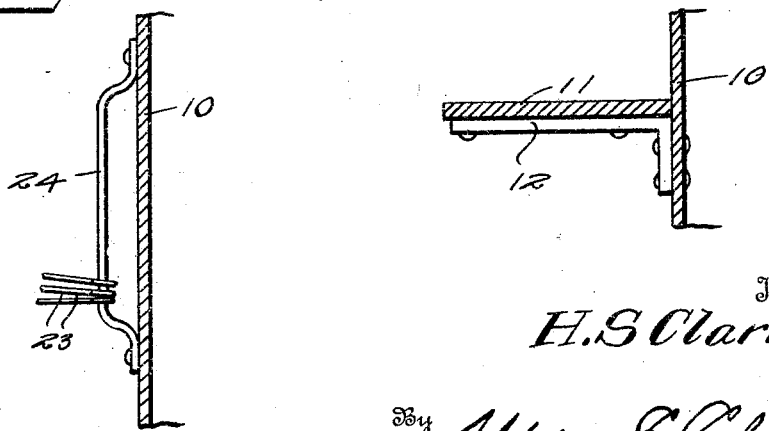
Inventor
H. S. Clark.
By Watson E. Coleman
Attorney Patented Jan. 25, 1927.

1,615,682

UNITED STATES PATENT OFFICE.

HUGH S. CLARK, OF ELIZABETH, NEW JERSEY.

AEROPLANE.

Application filed June 8, 1926. Serial No. 114,510.

This invention relates to aeroplanes and more particularly to a folding wing structure for use with an aeroplane using tractor and elevating propellers, so that the resistance to vertical movement may be reduced, when desired.

An important object of the invention is to provide a wing structure which may be readily folded in position against the side of the fuselage and so arranged that it offers little obstruction to vertical movement of the plane.

A further and more specific object of the invention is to provide a device of this character formed in a plurality of sections connected to one another in such manner that each section may completely overlie the preceding section or may be spread with relation thereto after the manner of the spreading of the sticks of a fan.

These and other objects I attain by the construction shown in the accompanying drawings, wherein for the purpose of illustration is shown a preferred embodiment of my invention and wherein:—

Figure 1 is a plan view partially broken away showing one side of a fuselage having a foldable wing constructed in accordance with my invention;

Figure 2 is a section on the line 2—2 of Figure 1;

Figure 3 is an enlarged section taken through the operating mechanism controlling the movement of the wing sections;

Figure 4 is a section on the line 4—4 of Figure 1;

Figure 5 is a bottom plan view of a portion of one of the wing sections showing the rib engaging yoke;

Figure 6 is a fragmentary view of the bottom of the wing section showing the coacting rib;

Figure 7 is a section on the line 7—7 of Figure 4;

Figure 8 is a section on the line 8—8 of Figure 2;

Figure 9 is a section on the line 9—9 of Figure 1;

Figure 10 is a detail sectional view showing the manner in which the wing sections nest upon the upper surface of the shelf.

Referring now more particularly to the drawings, the numeral 10 generally indicates the fuselage of an aeroplane which, in accordance with my invention, is provided at opposite sides thereof with longitudinally extending outwardly projecting shelves 11 suitably braced from the fuselage by brackets 12. Upon the forward end of each shelf is arranged a vertical pivot 13 upon which are superimposed the forward or inner ends of wing sections 14. The uppermost wing section 14 is secured at its hub portion to the pivot 13 and this pivot has secured thereto a gear 15 meshing with a segment gear 16 mounted upon a pivot 17 carried by the shelf and having an operating handle 18 operable from the interior of the fuselage. This handle may be locked in the extended or retracted position of the wing, hereinafter more fully explained, by any suitable locking device, such as indicated at 19.

Each wing section is provided upon its upper face with transversely extending guide ribs 20 engaged by yokes 21 carried by the under surface of the overlying wing section and arranged within grooves 21ª formed in the wing sections, so that adjacent faces of the wing sections may closely engage. These wing sections, when the yokes 21 are at one end of their associated guide ribs, have their adjacent edges slightly overlapped and when the yokes are at the opposite end of the guide rib, the wing sections are superimposed, so that the width thereof is the same as that of a single section 14. The shelf has a connection with the lowermost wing section 14 similar to that between the wing sections, as indicated at 22. This connection 22 limits the movement of the plane sections when the sections are fully extended and the wing is in its proper position. It will be obvious that a structure of this character may be very readily extended or folded during the flight of the aeroplane.

In order to suitably brace the ends of the sections, when in extended position, guy wires 23 are employed, the inner ends of which are connected with a suitable guide rib 24 secured to the side of the fuselage and the outer ends of which are secured to the outer ends of the wing section. Each guy wire 23 preferably embodies a resilient section 24 by means of which a constant tension is exerted against the outer end of the associated section 14.

Since the construction hereinbefore set forth is obviously capable of a certain range of change and modification without materially departing from the spirit of the invention, I do not limit myself to such specific structure except as hereinafter claimed.

I claim:—

1. In a folding wing construction for aeroplanes, a shelf secured to and extending longitudinally of the fuselage, a pivot at one end of the shelf, a plurality of segmental wing sections mounted upon the pivot, connections between the wing sections limiting movement of the wing sections from a position where the wing sections are superimposed to a position where adjacent edges of the sections slightly overlap and produce a fan-like wing structure and means for shifting the wing sections about the pivot.

2. In a folding wing construction for aeroplanes, a shelf secured to and extending longitudinally of the fuselage, a pivot at one end of the shelf, a plurality of segmental wing sections mounted upon the pivot, connections between the wing sections limiting movement of the wing sections from a position where the wing sections are superimposed to a position where adjacent edges of the sections slightly overlap and produce a fan-like wing structure, means for shifting the wing sections about the pivot including a gear secured to the uppermost wing section, a segment meshing with the gear, a lever shifting the segment and means for locking the lever in adjusted positions.

3. In a folding wing construction for aeroplanes, a shelf secured to and extending longitudinally of the fuselage, a pivot at one end of the shelf, a plurality of segmental wing sections mounted upon the pivot, connections between the wing sections limiting movement of the wing sections from a position where the wing sections are superimposed to a position where adjacent edges of the sections slightly overlap and produce a fan-like wing structure, means for shifting the wing sections about the pivot comprising ribs secured to the upper surfaces of each of the wing sections and the shelf with the exception of the uppermost wing section and yokes secured to the under surface of each wing section for coaction with the ribs of the underlying wing section or shelf.

4. In a folding wing construction for aeroplanes, a shelf secured to and extending longitudinally of the fuselage, a pivot at one end of the shelf, a plurality of segmental wing sections mounted upon the pivot, connections between the wing sections limiting movement of the wing sections from a position where the wing sections are superimposed to a position where adjacent edges of the sections slightly overlap and produce a fan-like wing structure, means for shifting the wing sections about the pivot including coacting rib and yoke elements upon opposed faces of the wing sections and of the lowermost wing section and shelf.

5. In a folding wing construction for aeroplanes, a shelf secured to and extending longitudinally of the fuselage, a pivot at one end of the shelf, a plurality of segmental wing sections mounted upon the pivot, connections between the wing sections limiting movement of the wing sections from a position where the wing sections are superimposed to a position where adjacent edges of the sections slightly overlap and produce a fan-like wing structure, means for shifting the wing sections about the pivot and guy wires connected at their lower ends to the fuselage beneath the shelf and at their upper ends to the extremities of said wing sections.

6. In a folding wing construction for aeroplanes, a shelf secured to and extending longitudinally of the fuselage, a pivot at one end of the shelf, a plurality of segmental wing sections mounted upon the pivot, connections between the wing sections limiting movement of the wing sections from a position where the wing sections are superimposed to a position where adjacent edges of the sections slightly overlap and produce a fan-like wing structure, means for shifting the wing sections about the pivot and guy wires connected at their lower ends to the fuselage beneath the shelf and at their upper ends to the extremities of said wing sections, each of said guy wires including an intermediate elastic section.

7. In combination with an aeroplane, a fan-like wing structure therefor composed of a plurality of relatively shiftable leaves spreading from a position where they are superimposed and lie closely against the side of the fuselage to a position where they extend outwardly from the fuselage and provide a continuous wing section connected at its inner end to the fuselage.

8. In a folding wing construction for aeroplanes, a shelf secured to and extending longitudinally of the fuselage, a pivot at one end of the shelf, a plurality of segmental wing sections mounted upon the pivot, connections between the wing sections limiting movement of the wing sections from a position where the wing sections are superimposed to a position where adjacent edges of the sections slightly overlap and produce a fan-like wing structure, means for shifting the wing sections about the pivot comprising ribs secured to the upper surfaces of each of the wing sections and the shelf with the exception of the uppermost wing section and yokes secured to the under surface of each wing section for coaction with the ribs of the underlying wing section or shelf, said yokes being located in grooves formed in the under surfaces of the wing sections and in which the ribs of the underlying wing section engage.

In testimony whereof I hereunto affix my signature.

HUGH S. CLARK.